United States Patent [19]

Marzocchi

[11] 4,045,592
[45] Aug. 30, 1977

[54] METHOD OF MAKING STRETCHABLE AND COMPRESSIBLE ELONGATE MEMBER

[75] Inventor: Alfred Marzocchi, Cumberland, R.I.

[73] Assignee: Owens-Corning Fiberglas Corporation, Toledo, Ohio

[21] Appl. No.: 637,992

[22] Filed: Dec. 5, 1975

Related U.S. Application Data

[60] Division of Ser. No. 608,592, Aug. 28, 1972, which is a continuation of Ser. No. 483,860, June 27, 1974, abandoned.

[51] Int. Cl.$^2$ .............................................. B05D 3/06
[52] U.S. Cl. .................................... 427/45; 264/45.5; 427/373; 427/385 A; 427/407 B
[58] Field of Search ............... 427/45, 373, 379, 385, 427/407; 428/370, 375, 378, 392, 397, 400; 264/45.5

[56] References Cited

U.S. PATENT DOCUMENTS

| | | | |
|---|---|---|---|
| 2,865,790 | 12/1958 | Baer | 427/45 |
| 3,062,682 | 11/1962 | Morgan et al. | 264/54 |
| 3,216,849 | 11/1965 | Jacob | 427/45 |
| 3,244,545 | 4/1966 | Marzocchi et al. | 428/392 |
| 3,462,523 | 8/1969 | Marzocchi et al. | 264/45 |
| 3,676,094 | 7/1972 | Russell | 428/392 |
| 3,728,146 | 4/1973 | Marzocchi | 428/392 |
| 3,740,257 | 6/1973 | Roscher | 427/45 |
| 3,787,224 | 1/1974 | Uffner | 428/378 |

Primary Examiner—John H. Newsome
Attorney, Agent, or Firm—John W. Overman; Ronald C. Hudgens; Allen D. Gutchess, Jr.

[57] ABSTRACT

A longitudinally stretchable and transversely compressible member is made by coating each of a bundle of generally parallel, continuous, non-interengaged strands with a vaporizable material (blowing agent), applying a thermosetting elastomeric material to the bundle so as to impregnate and surround the bundle and to separate the strands. A vapor impermeable skin is formed on the surface and the vaporizable material vaporized to form randomly disposed voids and to cause the strands to take an undulating path.

10 Claims, 4 Drawing Figures

U.S. Patent     Aug. 30, 1977     4,045,592
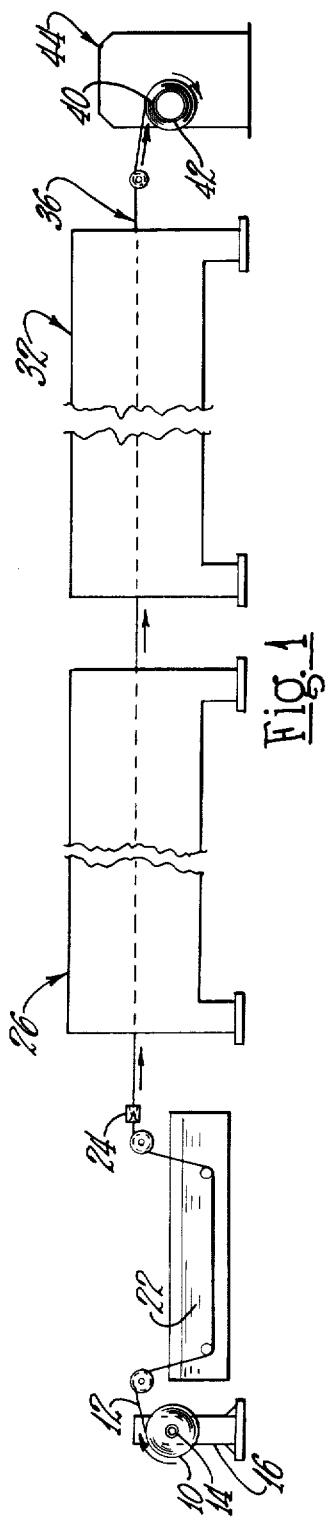
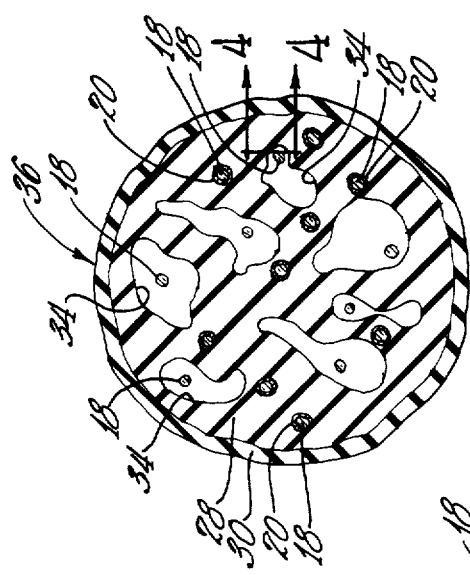
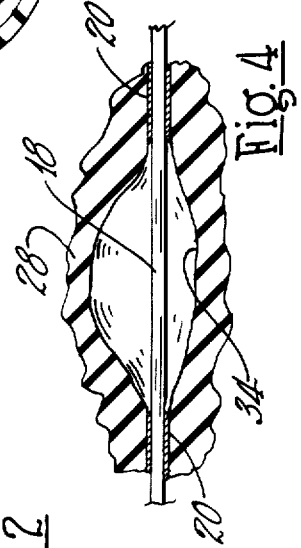
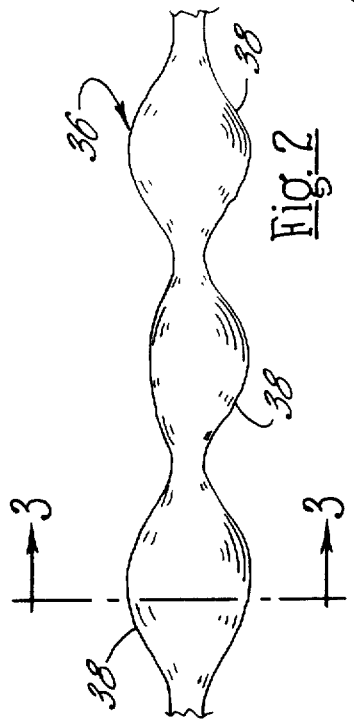

METHOD OF MAKING STRETCHABLE AND COMPRESSIBLE ELONGATE MEMBER

This is a division of application Ser. No. 608,592, filed Aug. 28, 1972, which is a continuation of application Ser. No. 483,860, filed June 27, 1974, now abandoned.

This invention relates to an elongate member which is longitudinally stretchable and transversely compressible and to a method of making same.

The elongate member in accordance with the invention includes a multiplicity of fibers, preferably glass filaments, arranged in a generally parallel, untwisted relationship. The filaments are ordinarily relatively inelastic or unyielding, particularly when made of glass which is exceptionally dimensionally stable. As such, if these filaments are arranged in a truly parallel and untwisted manner in an elongate member, the overall member likewise is substantially incapable of being stretched. The elongate member also includes a resilient matrix material surrounding the filaments and penetrating among them to isolate at least many from one another. A skin extends around and along the entire outer surface of the resilient material, providing a sheath or protective layer thereon. Within the resilient material, a multiplicity of irregularly-shaped voids are formed, extending irregularly along the entire length of the elongate member. The voids are formed after the resilient matrix material has been at least partially cured so that the voids force apart the filaments wherever the voids are formed with the filaments at such portions remaining farther apart than they otherwise would be if the voids did not exist. The voids thus cause the undulating pattern of the filaments to provide the longitudinal stretch, with the voids enabling the elongate member to be transversely compressed. The voids also increase the general diameter or maximum transverse dimension of the elongate member, forming irregular enlargements or bulbous portions therealong.

The stretchable characteristics of the elongate member enables it to serve more effectively as a reinforcing cord in certain reinforced materials, particularly rubber materials such as tires or certain belts. The stretchable characteristic of the elongate member enables it to yield more effectively with the material it reinforces whereas a non-stretchable reinforcing cord might simply tend to cut through the rubber in which it is imbedded when the rubber is stretched or deformed. The transversely-compressible characteristic enables the elongate member to serve as upholstery padding and packing material, for example. The irregular bulbous configuration of the overall elongate member also provides better adhesion between it and the material in which it is imbedded for reinforcing or other purposes, since it provides a larger surface area and also an irregular configuration which reduces the possibility of the elongate member being pulled longitudinally relative to the material in which it is imbedded.

In the method of making the elongate member, a multiplicity of filaments or fibers are arranged in a generally parallel, untwisted relationship. The filaments can be attenuated from a bushing in a well-known manner or the fibers in the order of 12-15 inches long can be attenuated from a rotary spinner, as is also well known. In a preferred form, the filaments or fibers are coated with a material which is capable of being vaporized, although this material can also be located in a resilient matrix material which is subsequently applied to the filaments or fibers, penetrating among them and also completely surrounding them. In either case, a skin is then formed on the outer surface of the resilient material, the skin being commonly formed thermally by applying high heat quickly to the surface of the resilient material, although it can also be formed chemically. The skin forms a protective sheath over the member but, while being more dense or stronger than the internal material, it is still yieldable. After the sheath or skin is formed, the vaporizable material therewithin, either as a coating on the fibers or as an addition to the resilient material, is vaporized by high frequency energy in a sudden manner to cause the vaporizable material to explode, in effect, and form the irregularly-shaped voids in the resilient material. Where the coating is on the filaments, each void will have at least one filament extending therethrough or along a wall thereof. Where the vaporizable material is separate, then at least many of the voids will not be associated with the filaments. In any event, where the voids exist, the maximum transverse dimension or diameter of the elongate member is correspondingly increased and the fibers are spread apart more fully than they otherwise would be if no voids existed at that point. The voids thereby force the fibers to assume the undulating pattern from one end of the elongate member to the other which imparts the stretchable characteristic to the member. The voids also provide the transversely-compressible characteristic for the member. The voids further establish a multiplicity of bulbous portions along the member depending upon the extent of the voids therealong, the bulbous portions being larger where the voids predominate.

It is therefore, a principal object of the invention to provide an improved elongate member which is longitudinally stretchable and transversely compressible.

Another object of the invention is to provide an elongate member suitable for use as a reinforcing cord in resilient material such as rubber.

A further object of the invention is to provide an elongate member having longitudinally-extending, untwisted fibers positioned in an undulating manner over the length of the member.

Yet another object of the invention is to provide an elongate member having a multiplicity of irregularly-shaped voids positioned therealong in a resilient matrix material of the member, enabling the member to be transversely compressible.

Yet a further object of the invention is to provide an elongate member having a plurality of bulbous portions spaced irregularly along the length thereof.

Still another object of the invention is to provide a method of making an elongate member which is longitudinally stretchable and transversely compressible by forming a multiplicity of internal voids in a resilient matrix material through which a multiplicity of fibers extend.

Still a further object of the invention is to provide a method of making a longitudinally-stretchable member which comprises surrounding a multiplicity of fibers with a resilient material, forming a skin on the resilient material, and subsequently causing vaporizable material within the resilient material to suddenly vaporize and form irregularly-shaped voids therein.

Many other objects and advantages of the invention will be apparent from the following detailed description of preferred embodiments thereof, reference being made to the accompanying drawings, in which:

FIG. 1 is a schematic, fragmentary side view in elevation of apparatus for producing an elongate member according to the invention;

FIG. 2 is an enlarged, schematic side view of an elongate member according to the invention;

FIG. 3 is a further enlarged, schematic view in transverse cross section taken along the line 3—3 of FIG. 2; and FIG. 4 is an even further enlarged, schematic view in section, taken along the line 4—4 of FIG. 3.

Fibers used in the elongate member according to the invention can be in the form of staple fibers, commonly 12-15 inches long, which are formed in a well-known manner from a rotary spinner. Molten glass in the spinner is thrown outwardly through holes in the side wall thereof by centrifugal force and the fibers are attenuated with the aid of a hot gaseous blast directed downwardly around the spinner. Preferably, however, the fibers are in the form of glass filaments of continuous length. Glass filaments are commonly attenuated from orifices in the bottom of a textile bushing, being pulled downwardly from the orifices and wound around a driven spindle or collet. Such filaments commonly are formed in a strand consisting of anywhere from 100–400 filaments, each having diameters from 0.00010 inch to 0.00050 inch. However, the filaments used in the elongate member according to the invention can be made in even a wider range of number, much less than a hundred or much more than 400, depending primarily on the use. The diameters can also be as much as twice the maximum diameter in the aforesaid range.

In a preferred form, the filaments are coated with a vaporizable material as they are being formed. Typically, the coating material can be applied by a coating applicator located a short distance under the bushing and having a projecting portion on which the coating exists and into contact with which the filaments are led as they are pulled downwardly from the bushing to a gathering shoe, where they are collected into a loose strand. The coating is essentially dry by the time the filaments reach the gathering shoe so that they do not strongly adhere to one another in the strand. The strand of coated filaments is then wound into a package on the rotatable spindle or collet driven at high speed. A finished package 10 of a coated strand 12 can then be transferred to a spindle 14 (FIG. 1) of a strand 16 for subsequent processing into an elongate member according to the invention.

Individual filaments 18 of the strand 12 are shown in section in FIG. 3, with a coating 20 of the vaporizable material appearing on a number of the filaments 18. Some of the filaments 18 never did receive a coating from the applicator as they were formed, with the number of uncoated filaments and the percentage of the total being uncoated increasing as the number of total filaments in the strand 12 increases. With others of the filaments 18 in FIG. 3, the coating has been vaporized and no longer exists on the filaments. Specifically, the coating can be a latex or a plastisol containing water in addition to the plasticizer. The water, which constitutes the vaporizable material in this instance, must be electrically conductive in order to be subsequently heated and vaporized by high-frequency energy as in the form of dielectric heating. Other suitable vaporizable materials will occur to those skilled in the art.

The coated strand 12 is led through a pool 22 of a resilient material. This material is preferably a thermosetting one and can be in the nature of an elastomeric material or rubber. The material also can be a urethane, an isocyanate, an amine, a carboxyl containing material, or combinations thereof, by way of example. The material also can be a resorcinol formaldehyde latex applied in two coats, the outer coat having an accelerator to facilitate formation of the outer skin. U.S. Pat. No. 3,787,224 to Uffner discloses suitable compositions for this material. A resulting coated strand of coated filaments is then led through an impregnating die 24 which forces the resilient material between the coated filaments 18 and around them so that most of the filaments are imbedded within the resilient material and separated from one another.

The coated strand is then led through an oven 26 in which the strand is subjected to high heat to at least partially cure the material from the pool 22 to form a resilient matrix material 28, as shown in FIG. 3, and also to form an outer skin 30 which is fully cured but is of a yieldable, resilient nature. By way of illustration, the oven 26 can be at a temperature of 500°-600° F. with the strand passed therethrough in 1-3 seconds. Rather than being formed by the heat in the oven, the skin 30 in some instances can be formed chemically, as by passing the coated strands through an acid bath. The skin can also be formed by using two materials, the inner one being rubber and toluene or water, and the outer one being rubber and ether. The ether evaporates faster to form the skin.

The coated strand with the skin is then led through a high frequency unit or dielectric oven 32 where it is subjected to high frequency energy. Solely by way of illustration, the electrodes in the oven 32 can be spaced 2 inches apart and operates at 50KV and 180 megacycles. This energy acts upon the conductive, vaporizable material within the skin 30, causing the material to substantially instantaneously vaporize and virtually explode, forming irregular voids 34 in the resilient material 28. The matrix material 28 at this point is sufficiently fluid to enable the voids 34 to be formed and yet is sufficiently viscous that the voids will not subsequently collapse. The skin constitutes a vapor barrier or vapor impervious portion around the matrix material 28. Without the skin 30, the vapors would tend to blow out through the surface of the material 28, producing a porous surface. At the same time, the voids would not tend to separate the filaments 18 into their undulating configurations nor would they tend to form the bulbous portions 38.

With the vaporizable material being in the form of the coating 20 on the filaments 18, each of the voids 34 will be associated with one of the filaments 18. In the event the vaporizable material is added separately, for example being in particulate form in suspension in the pool 22, then many of the voids 34 will be independent of the filaments 18.

In any case, the voids 34 tend to force apart the filaments 18 so that they are more widely spaced than if the voids were not formed. Likewise, the voids 34 increase the transverse dimension or diameter of a final elongate member indicated at 36 to form bulbous portions 38 along the member 36. In theory, the voids 34 might be expected to be formed along the entire length of the elongate member 36, along each of the filaments 18 having a coating thereon. In practice, however, the voids are formed irregularly and sporadically along the member. The coatings 20 on the filaments 18 are not precisely uniform in thickness and symmetry so that this in itself causes variations in the voids formed. Even the amount of vaporizable material within the coating 20 may vary along the length of the filaments. In addition, the coatings will not in practice be acted upon uniformly by the high frequency energy of the unit 32 so that vaporization will not uniformly occur. This is due in part to the relative positions of the coated filaments within the material 28 which affects their exposure to the high frequency energy. Further, the individual coated filaments may not retain a uniform position with respect to the energy sources as they pass from one end of the unit 32 to the other.

If, in fact, the voids 34 were uniformly formed along the entire length of the filaments 18 and the elongate member 36, the filaments would be uniformly spread apart and no significant increase in the stretchability characteristic of the elongate member would result, even though the member would be transversely compressible. However, with the individual voids 34 spreading apart the filaments 18, the filaments thereby assume an undulating configuration as they extend from one end of the member 36 to the other. This enables substantial stretch to be imparted to the elongate member 36 since tensile forces applied to space portions thereof will tend to cause the filaments 18 to assume straight configurations and the member to elongate or stretch accordingly. The resilient material 28 is sufficiently viscous and strong that the filaments will not cut through it as they tend to assume straight configurations, with the result that when the tensile forces are released, the filaments 18 will tend to assume their previous unstressed, undulating configurations and the elongate member 36 will shrink back substantially to its former length. In addition, the non-uniform formation of the voids 34 form the bulbous portions 38 on the member 36 and thereby increase the surface-volume ratio of the elongate member 36 so that it can adhere better to a material in which it is imbedded. The bulbous portion 38 also resists any overall longitudinal pull applied directly to the elongate member when imbedded in a reinforced material.

After the vaporizable material has vaporized in the high energy unit or dielectric oven 32, the final elongate member 36 can be wound into a package 40 on a collet 42 driven by a suitably source of power in a housing 44 which rotates the collet 42 and pulls the elongate member through the apparatus.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A method of making a stretchable cord comprising:
supplying a bundle of generally parallel continuous glass filaments;
applying a coating of vaporizable material to filaments;
subsequently applying a thermosetting elastomeric material to the bundle such that the material impregnates and surrounds the bundle and separates the filaments;
forming a vapor impervious skin on the outer surface thereof; and
applying energy to heat such bundle sufficient to effect curing the elastomeric material and such that at least a portion of the vaporizable material will vaporize to form irregular voids randomly located in the elastomeric material whereby the filaments assume undulating paths in the vicinity of the voids and whereby bulbous enlargements are formed at the outer suface of the cord in the vicinity of the voids.

2. The method of claim 1 wherein energy is applied to such bundle to form the voids by subjecting such bundle to high frequency electrical energy.

3. The method of claim 2 wherein the vapor impervious skin is formed by curing the outer surface of the elastomeric material.

4. The method of claim 1 wherein the vaporizable material is selected from the group consisting of a latex or a plastisol containing water and a plasticizer and wherein the resilient material is selected from the group consisting of rubber, a urethane, an isocyanate, an amine, a carboxyl containing material, or combination thereof, or resorcinol formaldehyde latex.

5. The method of making a longitudinally stretchable and transversely compressible elongate member comprising:
supplying a body of filaments;
applying a vaporizable material to at least some of the filaments;
subsequently impregnating such body with a thermosetting resilient matrix material;
forming a vapor impervious skin at the outer surface of the matrix material; and
subsequently heating such body sufficiently to effect curing of the thermosetting material and to vaporize at least some of the vaporizable material whereby voids are formed within the thermosetting material.

6. The method of claim 5 wherein such body is heated by subjecting such body to high frequency electrical energy.

7. The method of claim 6 wherein the vapor impervious skin is formed by curing the outer surface of the thermosetting material.

8. The method of claim 7 wherein the vaporizable material is selected from the group consisting of a latex or a plastisol containing water and a plasticizer and wherein the resilient material is selected from the group consisting of rubber, a urethane, an isocyanate, an amine, a carboxyl containing material, or combination thereof, a resorcinol formaldehyde latex.

9. The method of claim 8 wherein the vapor impervious skin is formed by heating the outer surface of the matrix material.

10. The method of claim 5 wherein the voids are formed such that each of the voids has at least one filament extending at least partially through said void.

* * * * *